Figure 1:
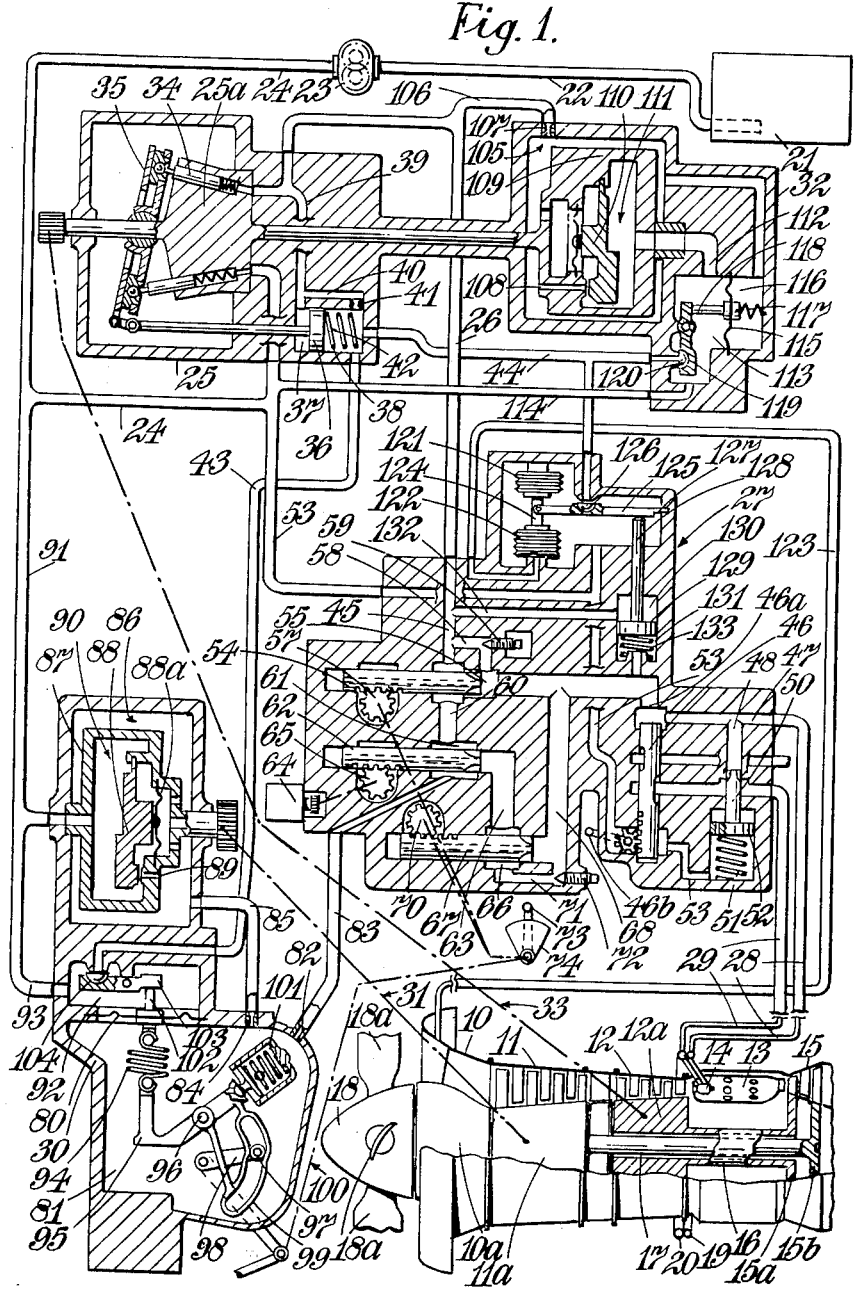

United States Patent Office 3,056,454
Patented Oct. 2, 1962

3,056,454
FUEL SYSTEMS FOR PROPELLER-DRIVING GAS TURBINE ENGINES
Kenneth Arnold Basford, Derby, and Harry Simister Bottoms, Birmingham, England, assignors to Rolls-Royce Limited, Derby, England, and Joseph Lucas (Industries) Limited, Birmingham, England, both British companies
Filed July 9, 1959, Ser. No. 825,927
Claims priority, application Great Britain July 15, 1958
6 Claims. (Cl. 170—135.74)

This invention comprises improvements in or relating to fuel systems for propeller-driving gas-turbine engines.

Modern aircraft have relatively high landing speeds and it is therefore desirable, even when normal wheel brakes are provided, to provide a form of braking means which facilitate ground operation of the aircraft and provide better control than wheel brakes when landing for instance on an icy runway. It is now proposed that the propeller should be a reversible pitch propeller so as to give when engine-driven in reverse pitch a strong braking effect on the aircraft, whereby the length of the landing run can be reduced substantially without the heavy application of wheel brakes, whereby under icy conditions the aircraft may be braked without skidding due to locking of the landing wheels by application of the wheel brakes, and whereby manoeuvring is facilitated particularly in the case of a multi-engined aircraft.

This invention has for an object to provide a fuel system for a propeller-driving gas turbine engine whereof the propeller is a reversible pitch propeller capable of being engine-driven for braking purposes, whereby the operation of the engine is facilitated.

According to the present invention, a fuel system for a gas turbine engine driving a reversible pitch propeller, comprises two throttle valves arranged in parallel passages in a pressure fuel line leading to combustion equipment of the engine, which throttles are connected for operation to a pilot's control so that one throttle (the forward throttle) is operative to vary the fuel supply during normal forward thrust operation and the other throttle (the reverse throttle) is operative to vary the fuel supply during operation with the propeller in reverse pitch.

Preferably, the pilot's control comprises a control lever having ranges of movement from an idling setting corresponding respectively to forward thrust operation and reverse thrust operation and each throttle consists of a plunger type valve co-operating with an orifice and the plungers are connected to a pilot's control lever so that each moves throughout the ranges of movement of the control lever and so that, whilst one plunger is varying the effective area of its associated orifice, a constant cross-section portion of the other plunger occupies its associated orifice.

According to a feature of this invention, there may be provided a pair of restricted flow passages respectively by-passing the two throttles to meter the fuel flows for idling purposes and a third throttle valve is arranged in the passage containing the reverse throttle valve, the third throttle valve being independently operable to cut off fuel from or permit flow of fuel to the reverse throttle and its restricted by-pass passage. In use of such a fuel system, during starting, the forward and third throttles will be closed so that fuel flows to the engine through the restricted by-pass passage of the forward throttle and through a leak past the forward throttle; during idling on the ground, the third throttle will be either closed or open; and during flight idling the third throttle will be open. Preferably with this arrangement, the reverse throttle is slightly open at the idling setting of the pilot's control and there is provided speed governor means responsive to the rotational speed of the propeller and operative to trim the fuel supply to the engine to prevent the rotational speed of the propeller exceeding a selected value. The selected speed will be low relative to the normal rotational speeds permitted during power operation in flight or power operation when braking with reverse thrust.

According to a feature of this invention, the speed governor means may have a variable datum which is adjustable by setting of the pilot's control and which is set in the idling setting of the pilot's control to prevent the propeller speed from exceeding said selected value, to select a top rotational speed value for the propeller in the range of settings of the pilot's control corresponding to forward thrust operation, and to increase progressively the maximum propeller speed permitted from said selected value as the pilot's control is moved from the idling setting for reverse thrust operation.

Propeller-driving gas turbine engines may be of the kind having independently rotating low-pressure and high-pressure rotors, each comprising a compressor and an associated turbine, the propeller being driven by the low-pressure rotor. Clearly in the case of such engines the speed governor means will control the low-pressure rotor and there will also be provided a top speed governor for the high-pressure rotor. There will also be provided a fuel control which is responsive to, say, the pressure in the air intake of the engine to reduce the fuel flow as the aircraft altitude increases.

Figure 2:
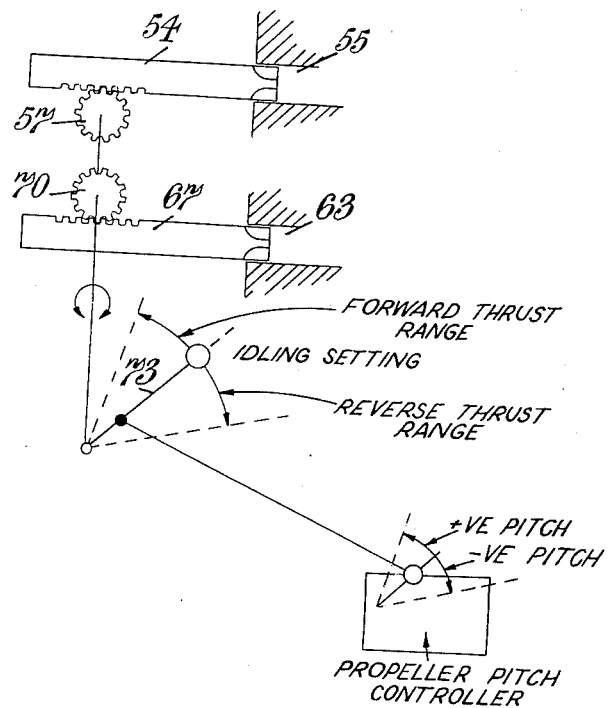

One form of propeller-driving gas-turbine engine and a fuel system of this invention is diagrammatically shown in the accompanying drawings, in which FIGURE 1 illustrates a gas turbine engine and its fuel system, and FIGURE 2 is a diagrammatic illustration of the throttle arrangement.

The engine illustrated in FIGURE 1 comprises non-rotating air intake structure 10 leading to a low-pressure compressor 11 comprising a rotor 11a, the delivery of the low-pressure compressor 11 feeding the air compressed therein to the entry of a high-pressure compressor 12 having a rotor 12a.

The air leaving the high-pressure compressor 12 flows into combustion equipment 13 into which fuel is fed by fuel injectors 14 and the combustion products leave the combustion equipment 13 to pass through a multi-stage turbine 15. The turbine 15 comprises a high-pressure rotor 15a which is connected by a hollow shaft 16 to the rotor 12a of the high-pressure compressor, and a low-pressure turbine rotor 15b which is connected by a shaft 17 to the rotor 11a of the low-pressure compressor, the shaft 17 extending coaxially through the shaft 16 and the high-pressure compressor rotor 12a.

The air intake structure 10 comprises a central casing member 10a housing a reduction gear providing a driving connection between the rotor 11a of the low-pressure compressor 11 and a propeller 18. The propeller is of the variable-pitch kind and its blades 18a are arranged to be adjustable in pitch so as to be capable of operating to give either normal forward thrust for flight purposes or a reverse thrust for braking purposes.

The fuel injectors 14 may either be of the Duplex type, that is, of the type having two orifices through one of which pilot fuel is injected into the combustion equipment 13 and through the other of which the main fuel supply is fed to the combustion equipment or alternatively, separate pilot and main fuel injectors may be provided. The pilot fuel supply is led to the injectors from a pilot fuel manifold 19 and the main fuel supply is led to the injectors from a manifold 20.

The fuel system illustrated for delivering fuel to the manifolds 19 and 20 from a fuel tank 21 comprises a suction pipeline 22 leading from the tank to a booster pump 23, a low-pressure fuel line 24 leading from the booster pump 23 to a main fuel pump 25, a high-pressure fuel line 26 leading from the delivery of the main pump 25 to a throttle and control unit 27, and pilot and main delivery lines 28, 29 leading from the unit 27 to the manifolds 19 and 20 respectively.

The fuel system also comprises a low-pressure hydromechanical governor 30 which is driven through mechanical interconnection 31 at a speed proportional to the speed of the low-pressure rotor 11a, 15b and propeller 18 and a high-pressure hydro-mechanical governor 32, which, like the main fuel pump 25, is driven by mechanical interconnection 33 from the high-pressure rotor 12a, 15a.

The main fuel pump 25 is illustrated as a multi-plunger type positive-displacement pump whereof the stroke of its plungers 34 can be varied by means of a swash plate 35 the angle of inclination of which is under control of an hydraulic servo mechanism. By angularly adjusting the plane of the swash plate 35 so as to approach a plane at right angles to the axis of rotation of the pump rotor 25a, the delivery of the pump 25 is decreased, and conversely by increasing the angle between the plane of the swash plate 35 and the plane at right angles to the rotor axis, the delivery of the pump is increased.

The servo-mechanism controlling the angle of inclination of the swash plate 35 comprises a piston 36 separating a pair of cylinder spaces 37, 38, of which space 37 is directly connected by duct 39 to the delivery side of the pump 25 and of which space 38 is connected to the pump delivery by duct 39, duct 40 and flow restrictor 41. The space 38 also houses a spring 42 which operates to urge the swash plate 35 in the sense to increase the fuel pump delivery.

The space 38 has connected to it a pair of vent pipes 43, 44, of which the vent pipe 43 leads to the low-pressure hydro-mechanical governor 30 and the vent pipe 44 leads to the high-pressure hydro-mechanical governor 32 and to an air pressure control shown as part of the control and throttle unit 27.

On increase of flow through either vent pipe 43 or 44 the pressure within space 38 falls and the piston 36 moves to the right as viewed in the drawing, so decreasing the inclination of the swash plate 35 and decreasing the output of the main fuel pump 25. Conversely on decrease of the flow in either of the vent pipes 43, 44 the pressure in space 38 rises so that piston 36 moves to the left increasing the fuel pump delivery.

The hydro-mechanical governors 30 and 32 are arranged to so control the flow in the vent pipes 43, 44 that the rotational speeds of the respective rotors do not exceed appropriate values and the air pressure control varies the fuel supply to the engine in accordance with the pressure within the air intake structure 10 thereby to accommodate variations in the engine fuel requirements due to variations in the ambient atmospheric pressure. The construction and operation of these units will be described more fully below.

The unit 27 comprises a fuel inlet duct 45 connected with the high-pressure fuel line 26 and leading to a throttle arrangement in accordance with this invention, and also comprises downstream of the throttle arrangement a plunger-type shut-off cock 46 which is operated by lever 46b and controls the flow to a first outlet duct 47 connected with the pilot fuel pipe 28 and a second outlet duct 48 connected with the main fuel pipe 29. The duct 48 has connected in it a valve 50 which is displaced by the pressure of fuel in the duct 48 upstream of the valve against the action of a spring 51. The valve 50 is carried by a piston member 52 having its opposite sides interconnected so that the piston member acts as a damper for the valve 50. The piston is connected by ducts 53 to be loaded by the fuel pressure at the inlet side of the main fuel pump 25, and thus until the pressure just upstream of the valve 50 exceeds the inlet pressure of the pump 25 by a selected amount determined by the spring 51, fuel is only delivered to the pilot fuel delivery line 28.

The throttle arrangement comprises (FIGURES 1 and 2) a first throttle plunger 54 co-operating with the inlet to a passage 55 leading to a port 46a controlled by the shut-off cock 46. The first throttle plunger 54 is moved axially of itself by a pinion 57 and has a shaped end by which the amount of fuel entering passage 55 can be varied and a parallel-sided portion which under certain conditions of operation enters the inlet end of the passage 55 to close it or to allow a small leakage flow. The plunger 54 has associated with it a by-pass passage 58 the flow through which can be set by means of an adjustable restrictor 59. The plunger 54 will be referred to hereinafter as the "forward throttle valve" and the by-pass passage 58 will be referred to as the "idling by-pass."

The stem of the forward throttle valve 54 is surrounded by a fuel gallery 60 which is connected to deliver fuel to a further fuel gallery 61 surrounding the stem of a plunger-type throttle valve 62. The throttle valve 62 will be referred to hereinafter as the "idle throttle valve" and it co-operates with the entry to a passage 63 to control the flow therein. The idle throttle valve 62 is moved by an electrical actuator 64 via operating pinion 65 and is either set to be fully closed or to be fully open.

The downstream end of the passage 63 leads to a fuel gallery 66 surrounding the stem of a plunger-type throttle 67 which will be referred to hereinafter as the "reverse throttle valve" and the reverse throttle valve 67 has a shaped portion at one end co-operating with the entry to a duct 68 leading from the gallery 66 to the duct 55 downstream of the forward throttle valve 54. The position of the reverse throttle valve 67 is varied by a pinion 70 and in some positions of adjustment a parallel sided portion of the stem of the valve closes-off the connection between the gallery 66 and the duct 68 whilst in other positions the shaped end varies the cross-sectional area of entry to the duct 68.

The reverse throttle valve 67 has associated with it a by-pass passage 71 the effective restriction of which is controlled by an adjustable restrictor element 72. This by-pass will be referred to as the "flight idling by-pass."

The pinions 57 and 70 for moving the forward throttle valve 54 and reverse throttle valve 67 respectively are connected together for simultaneous movement under control of a pilot's control lever 73 which has forward thrust and reverse thrust ranges of movement in a gate 74 from the idling setting shown. Each of the throttles 54 and 67 is moved throughout the ranges of movement of the lever 73 but whilst the shaped portion of the forward throttle valve 54 is co-operating with its orifice to vary the effective area of entry to duct 55 the parallel-sided portion of the reverse throttle valve 67 occupies the entry to the duct 68, and conversely whilst the shaped portion of the reverse throttle valve 67 is varying the area of the entry to the duct 68 the parallel-sided portion of the forward throttle valve 54 occupies the entry to the duct 55. It is arranged that in the idling setting of the lever 73 the reverse throttle valve 67 is slightly open and the parallel portion of the forward throttle valve 54 is operative in the entry to duct 55. The lever 73 on adjustment also controls a mechanism for example as described in U.S. Patent No. 2,978,035, granted April 4, 1961 (L. Haworth) for varying the pitch of the blades 18a of propeller to ensure that they have a forward thrust setting, or +ve pitch, in normal operation and a reserve thrust setting, or -ve pitch, when operating in the reverse thrust range of lever 73.

The throttle arrangement just described avoids difficulties likely to be experienced with an arrangement in which the forward and reverse throttle valves are made as a common element having oppositely disposed control profiles one of which is employed for forward thrust operation and the other for reverse thrust operation, and, where a day temperature trim control is provided, the arrangement also avoids unnecessary adjustment of the reverse throttle by the day temperature control.

In operation, when starting up the engine, the pilot's control lever 73 is set in a position such that the propeller blades 18a are in a position of low forward thrust, and the idle throttle valve 62 is set to close the entry to duct 63 so that, although due to the setting of lever 73 the reverse throttle valve 67 is slightly open, fuel only reaches the pilot fuel line 28 leading to the engine through the idling by-pass 58 and the leak past the forward throttle valve 54. When the engine speed has reached a particular value the idle throttle valve 62 is opened and thus fuel may reach the engine not only via the idling by-pass 58 but also via the reverse throttle valve 67 and the flight idling by-pass 71. When the idle throttle valve 62 is fully open the engine speed tends to increase to a value which is determined by the quantity of fuel which flows through the reverse throttle valve 67, the flight idling by-pass 71 and the idling by-pass 58. It is arranged however that the rotational speed of the low-pressure rotor 11a, 15b and thus of the propeller 18 cannot exceed a selected value by controlling the rate of fuel supply to the engine by means of the low-pressure hydro-mechanical governor 30.

To increase forward thrust the lever 73 is moved from the idle setting shown in the appropriate direction to move the forward throttle valve 54 to the left so opening the entry to passage 55 to an increasing extent. During this movement the reverse throttle valve 67 is moved to the right so that the entry to duct 68 is closed by the parallel portion of the reverse throttle valve. During the initial part of this movement of the control lever 73 the setting of the low-pressure hydro-mechanical governor 30 is altered to increase the maximum rotational speed which the low-pressure rotor and propeller can achieve, and over a greater part of this range of movement this value of the rotational speed is constant at a value in excess of the speed of the low-pressure rotor attained in take-off.

During movement of the control lever 73 from the idling setting shown in the other range of its movement (the reverse pitch range) the reverse throttle valve 67 is moved to the left so opening the entry to the duct 68 to an increasing extent and simultaneously the forward throttle valve 54 is moved to the right so that its parallel portion enters the entry to duct 55. During this range of movement of the control lever 73 the value of the maximum speed governed by the low-pressure hydro-mechanical governor 30 is progressively increased.

The low-pressure hydro-mechanical governor 30 comprises a diaphragm 80 which is loaded on one surface by the pressure within a chamber 81 which is connected via restrictor 82 and duct 83 to receive fuel from the delivery of the main fuel pump 25 and which is connected via restrictor 84 and duct 85 to a chamber 86 having an outlet 89 provided through the rotor 87 of the hydro-mechanical governor, the outlet 89 being under control of the speed-responsive element 88. The outlet 89 leads to a chamber 90 within the rotor 87 of the hydro-mechanical governor which is connected by conduit 91 to the inlet side of the main fuel pump 25. The opposite side of diaphragm 80 faces a chamber 92 which is connected by a pipe 93 to the inlet side of the main fuel pump 25.

In operation as the speed of the rotor 87 of the hydro-mechanical governor increases so the speed-responsive device 88 tends to close-off the flow through the outlet 89 so that the pressure within the chamber 81 tends to increase, and conversely, as the speed of the rotor 87 falls so the speed-responsive device 88 tends to open the outlet 89 causing a fall in pressure in the chamber 81. The changes in pressure in the chamber 81 are proportional to the square of the rotational speed of the rotor 87 and thus the diaphragm 80 is subjected to a resultant load which is directly proportional to the square of the rotational speed.

The diaphragm 81 is loaded by a tension spring 94 having an adjustable anchorage 95 which is pivoted in the body of the governor 30 at 96 and which is arranged to be rocked by co-operation of a roller 97 carried by an arm 98 with a cam track 99 forming part of the anchorage. The arm 98 is linked by a connection 100 with the control lever 73 so as to be adjustable by it. The adjustable anchorage 95 is also loaded by a mechanism 101 the purpose of which is to reduce the operating loads between the roller 97 and the cam track 99.

The diaphragm 80 carries a tappet 102 which engages a pivoted lever 103 carrying a half-ball valve element 104 controlling the outlet from the vent pipe 43. In operation, when the pressure load acting on the diaphragm 80 becomes sufficiently high to overcome the effect of the tension spring 94 the lever 103 is rocked to open the vent valve 104 so permitting an increase in the flow through the vent pipe 43 and causing a reduction in the delivery of the main fuel pump 25. The rotational speed at which opening of the half-ball valve 104 occurs depends upon the setting of the adjustable anchorage 95 under control of the control lever 73.

The hydro-mechanical governor 32 acts to reduce the fuel supply to the engine in the event that the high-pressure rotor 12a, 15a tends to overspeed and it is of generally similar construction to the hydro-mechanical governor 30 except that it does not have a variable datum adjustable by the control lever 73.

The governor 32 comprises a chamber 105 connected with the high-pressure fuel delivery line 26 by pipe 106 and restrictor 107 and having an outlet 108 through the rotor 109 of the governor under control of speed-responsive element 110. The interior 111 of the rotor 109 is connected by duct 112 to a chamber 113 having an outlet pipe connection 114 to the inlet side of the main fuel pump 25. The chamber 113 has as a wall thereof a flexible diaphragm 115 which also forms the wall of a chamber 116 connected with the chamber 105. The diaphragm is loaded by a tension spring 117 and has a tappet 118 for actuating a lever 119 carrying a half-ball valve 120 controlling one outlet from the vent pipe 44. In operation, the pressure difference across the diaphragm 115 is controlled by the speed-responsive device 110 to vary as the square of the rotational speed of the high-pressure rotor 12a, 15a and when the load on the diaphragm tends to exceed a selected value the tension spring 117 is overcome and the half-ball valve 120 is lifted so allowing increased flow through the vent pipe 44 and causing a reduction in the delivery of the fuel pump 25.

As above indicated, the unit 27 comprises means for controlling the pressure drop across the throttles in accordance with the pressure in the air intake of the engine. This means comprises a pair of capsules 121, 122, of which the capsule 121 is evacuated and the capsule 122 is subjected internally to the pressure in the air intake structure 10 via conduit 123. The two capsules are of equal area and are connected together by a rod 124 which is pivoted to one end of a lever 125 carrying a half-ball valve 126 controlling a further outlet from the vent pipe 44. The lever 125 is pivoted at 127 to the casing of the unit 27 and is also loaded in accordance with the pressure drop across the throttles. This is effected by means of a rod 128 carried by a piston 129 dividing cylinder spaces 130, 131, the space 130 being connected by duct 132 to the duct 45 upstream of the throttles, and the space 131 being connected with the fuel supply passages just downstream of the throttles. The space 131 also houses a compression spring 133 urging the piston 129 towards the lever 125. It will be seen that an increase in the pressure within the air intake structure 10 tends to rock lever 125 to close the half-ball valve 126 onto the outlet from the vent pipe 44.

The spring 133 also tends to close the half-ball valve 126 onto the outlet from the vent pipe 44. The loads applied by the capsules 121 and 122 and by the spring 133 are opposed by the load on the piston 129 which is dependent upon the pressure drop across the throttles and thus the half-ball valve 126 takes up a position under steady running conditions such that the pressure drop across the throttles is determined in accordance with the air pressure existing in the air intake structure 10. As the air pressure in the intake structure 10 increases so the pressure drop across the throttles is increased and for a given setting of the throttles the fuel flow to the engine is increased. A decrease in the air pressure resulting say from an increase in the altitude of the aircraft causes a corresponding reduction in the pressure drop across the throttles and thus for a given setting of the throttles causes a corresponding reduction in the fuel flow to the engine.

We claim:

1. For a gas turbine having combustion equipment and a reversible pitch propeller, a fuel system supplying fuel to the combustion equipment comprising fuel pressurizing means, fuel pressure ducting connected to receive pressure fuel from the fuel pressurizing means and delivering to the combustion equipment, said ducting including a first fuel flow passage and a second fuel flow passage in parallel with the first fuel flow passage, said first and second fuel flow passages having a common inlet and a common outlet, a first throttle valve adjustable to vary the fuel flow in said first passage, a second throttle valve adjustable to vary the fuel flow in the second passage, a settable control member having a first range of settings corresponding to forward thrust operation of the propeller and a second range of settings corresponding to reverse thrust operation of the propeller, the first and second throttle members being each connected to the control member to be moved thereby, the first throttle member being moved to permit a flow of fuel through the first passage only for settings of the control member in said first range of settings and the second throttle member being moved to permit a flow of fuel through the second passage only for settings of the control member in said second range of settings.

2. A fuel system according to claim 1, the control member comprising a control lever having ranges of angular movement from an idling setting corresponding respectively to forward thrust operation and reverse thrust operation, and each of said throttle members consisting of a plunger type valve having a shaped portion and a constant cross-section portion, each valve co-operating with an orifice in the associated fuel flow passage, each of said valves being connected to the control lever to be moved throughout both said ranges of movement of the control lever, the shaped portion of the first throttle member varying the effective area of its associated orifice and a constant cross-section portion of the second throttle member occupying and closing its associated orifice during angular movement of the control lever in the range corresponding to forward thrust operation, and the constant section portion of the first throttle member occupying and closing its associated orifice and the shaped portion of the second throttle member varying the effective area of its associated orifice during angular movement of the control lever in the range corresponding to reverse thrust operation.

3. For a gas turbine having combustion equipment and a reversible pitch propeller, a fuel system supplying fuel to the combustion equipment comprising fuel pressurizing means, fuel pressure ducting connected to receive pressure fuel from the fuel pressurizing means and delivering to the combustion equipment, said ducting including a first fuel flow passage and a second fuel flow passage in parallel with the first fuel flow passage, said first and second fuel flow passages having a common inlet and a common outlet, a first throttle valve adjustable to vary the fuel flow in said first passage, a second throttle valve adjustable to vary the fuel flow in the second passage, a settable control lever having ranges of angular movement from an idling setting corresponding respectively to forward thrust operation and reverse thrust operation, and each of said throttle members consisting of a plunger type valve having a shaped portion and a constant cross-section portion, each valve cooperating with an orifice in the associated fuel flow passage, each of said valves being connected to the control lever to be moved throughout both said ranges of movement of the control lever, the shaped portion of the first throttle member varying the effective area of its associated orifice and a constant cross-section portion of the second throttle member occupying and closing its associated orifice during angular movement of the control lever in the range corresponding to forward thrust operation, and the constant section portion of the first throttle member occupying and closing its associated orifice and the shaped portion of the second throttle member varying the effective area of its associated orifice during angular movement of the control lever in the range corresponding to reverse thrust operation, a pair of restricted flow passages respectively by-passing the first and second throttle members and permitting metered fuel flows for idling purposes, and a third throttle valve in the second passage, the third throttle valve being independently operable between a position in which fuel is cut off in the second passage and a position in which fuel is permitted to flow to the second passage.

4. A fuel system according to claim 3, said second throttle member being set to be slightly open on adjustment of the control lever to its idling setting, and there being provided speed governor means responsive to the rotational speed of the propeller and operative when the control lever is adjusted to its idling setting to trim the fuel supply to the engine to prevent the rotational speed of the propeller exceeding a selected value, which selected value is low relative to the normal rotational speeds of the propeller permitted during power operation.

5. A fuel system according to claim 4, said speed governor means having variable datum means connected to be adjusted by setting of the control lever, said datum means being set on adjustment of the control lever to its idling setting to prevent the propeller speed from exceeding said selected value, said datum means being further set by adjustment of the control lever into its range of movement corresponding to forward thrust operation to select a top rotational speed value for the propeller, and said datum means also being set by adjustment of the control lever in its range of movement corresponding to reverse thrust operation to increase progressively the permitted maximum propeller speed from said selected value as the control lever is moved from the idling setting.

6. In combination, a gas turbine engine comprising combustion equipment, independently rotating low-pressure and high-pressure rotors, each rotor comprising a compressor and an associated turbine, a reversible pitch propeller connected to be driven by the low-pressure rotor, and a top-speed governor controlling the high-pressure rotor, and a fuel system supplying fuel to the combustion equipment comprising fuel pressurizing means, fuel pressure ducting connected to receive pressure fuel from the fuel pressurizing means and delivering to the combustion equipment, said ducting including a first fuel flow passage and a second fuel flow passage in parallel with the first fuel flow passage, said first and second fuel flow passages having a common inlet and a common outlet, a first throttle valve adjustable to vary the fuel flow in said first passage, a second throttle valve adjustable to vary the fuel flow in the second passage, a settable control member having a first range of settings corresponding to forward thrust operation of the propeller and a second range of settings corresponding to reverse thrust operation of the propeller, the first and second throttle members being each connected to the control member to be moved thereby, the first throttle member being moved to permit a flow of fuel through the first passage only for settings of the control member in said first range of settings and the second throttle member being moved to permit a flow of fuel through the second passage only for settings of the control member in said second range of settings.

References Cited in the file of this patent

UNITED STATES PATENTS

| | | |
|---|---|---|
| 2,474,033 | Chamberlin et al. | June 21, 1949 |
| 2,669,838 | Lee | Feb. 23, 1954 |
| 2,802,335 | Skellern | Aug. 13, 1957 |
| 2,856,754 | Torell | Oct. 21, 1958 |